United States Patent [19]
Götz

[11] 3,956,618
[45] May 11, 1976

[54] MECHANICAL-ELECTRICAL TRANSDUCER

[75] Inventor: Karl Georg Götz, Tubingen, Germany

[73] Assignee: Max-Planck-Gesellschaft zur Forderung der Wissenschaften e.V., Gottingen, Germany

[22] Filed: May 7, 1974

[21] Appl. No.: 467,825

[30] Foreign Application Priority Data
Dec. 10, 1973 Germany............................ 2361385

[52] U.S. Cl............................ 235/151.3; 324/34 D; 318/578; 318/656
[51] Int. Cl.² ........................................ G06G 7/78
[58] Field of Search.................... 33/363 K, DIG. 5; 324/41; 73/517 R, 517 B; 273/186 A, 186 R; 318/578, 656; 235/151.3

[56] References Cited
UNITED STATES PATENTS
2,552,722  5/1951  King................................. 33/DIG. 5
3,023,627  3/1962  Geyling............................. 73/517 R OTHER PUBLICATIONS
*IBM Technical Hand–Held Bulletin*, Hand-Held Control Cup, p. 1062, Vol. 11, No. 9, Feb. 1969.

Primary Examiner—Eugene G. Botz
Attorney, Agent, or Firm—Brisebois & Kruger

[57] ABSTRACT

A mechanical-electrical transducer for the simultaneous contact-free and reaction free determination of a plurality of translatory and/or rotary components of the motion or position of an object coupled to the transducer, with a computer circuit which generates signals corresponding in sign and magnitude to the components of the deviation of the object from a predetermined initial position.

7 Claims, 7 Drawing Figures

MECHANICAL-ELECTRICAL TRANSDUCER

The invention relates to a mechanical-electrical transducer for the simultaneous contact-free and reaction-free determination of a plurality of translatory and/or rotary components of the motion or position of an object coupled to the transducer, in particular inductively coupled by means of a ferrite body, with a computer circuit which generates signals corresponding in sign and magnitude to the components of the deviation of the object from a predetermined initial position.

In the electrical measuring art differential transformers and differential chokes are frequently used for the determination of a single component of motion. They operate generally without contact and, in contrast to devices having adjusting potentiometers or the like, they comprise no parts subject to wear. The known differential transformers have usually two secondary windings, which are arranged at either side of a central primary coil, and whose inductive coupling can be varied in mutually opposite senses by a movable ferrite body. The difference voltage of the secondary windings resulting from unequal inductive coupling can, by phase-dependent rectification, be converted into a direct voltage signal, whose sign and magnitude corresponds to the longitudinal movement of the ferrite body from a central position. If the displacement of the ferrite body proceeds upon a prescribed circular path, then the direct current signal can be employed for measuring the rotary motion about the centre of the circle. In the known types of differential choke, a certain simplification of the principle is achieved by omitting the primary excitation coil. The remaining secondary coils are in this case to be regarded as choke coils, whose alternating current resistances depend upon the position of the ferrite body. The position-dependent electrical signal is in this case derived in an analogous manner from the difference between the alternating current resistances, for example by the aid of a suitable bridge circuit. In many cases it is necessary to determine simultaneously the mutually independent components of the translational and rotational deviations of an object from an initial location and orientation in a given plane or in a given space. The known combinations of contact-free one-component transducers such as differential transformers and differential chokes are not suitable for mutually independent measurements of the required components of translation and rotation.

The purpose of the present invention is to provide a transducer which gives the complete information on the translation and rotation of an object in a two-dimensional plane or three-dimensional space.

The present invention solves these problems by a set of algebraic operations simultaneously applied to the signals available from either a multipole differential transformer, or from a multipole differential choke, the result of the operation being the requested set of mutually independent components describing by magnitude and sign the deviation of an object from an initial location and orientation in a given plane or space.

According to the invention, by suitable combination of three or more output voltages of a multiple component differential transformer, or three or more output impedances of a multiple component differential choke, it is possible to derive in a simple manner from the corresponding sum and difference signals, for example, the three motion components, longitudinal motion (L), transverse motion (Q) and rotary motion (D) of a ferrite object in one plane. If an anisometric ferrite object of different length breadth and height is arranged between two differential transformers or chokes of the herein described type, it is possible to derive from the output voltage six signals, which correspond to the possible rotary and translatory components of the movements in three directions mutually at right angles in space. The described devices are particularly suitable for the control of servo systems, whereby an object, or a number of similar objects, can be brought into a precisely predetermined position and direction in the plane or in space, which position and direction are to be maintained constant. Similar problems arise in the automatic working or installation of small sensitive mechanical, optical or electronic workpieces. For this purpose the workpieces are first fitted with a shaped adaptor for accommodating a suitable ferrite body, and after insertion of the ferrite body the workpieces are brought into the vicinity of the mechanical-electrical transducer. In the case of small workpieces a ferrite body of a few milligrammes weight will in general suffice. The displacement of the workpiece out of its nominal position generates one or more output signals deviating from the null position. Each of these signals can be effective, through a following power amplifier and a servo drive to produce a contra-movement, which operates to reduce the associated output signal. The servo system comes to the steady condition when the workpiece precisely assumes the nominal position, i.e. when all the output signals have been compensated to zero by the mechanical back-coupling.

In general it is possible for the output quantities of the multiple component transducer here described to be delivered to suitable servo systems, which either effect the resetting of the workpiece into the initial position, or effect the conveyance of a workpiece into a predetermined nominal position or effect the movement of the multiple component transducer in conformity with the moved workpiece.

Preferred practical examples of the invention are illustrated in the accompanying drawings.

Figure 1:
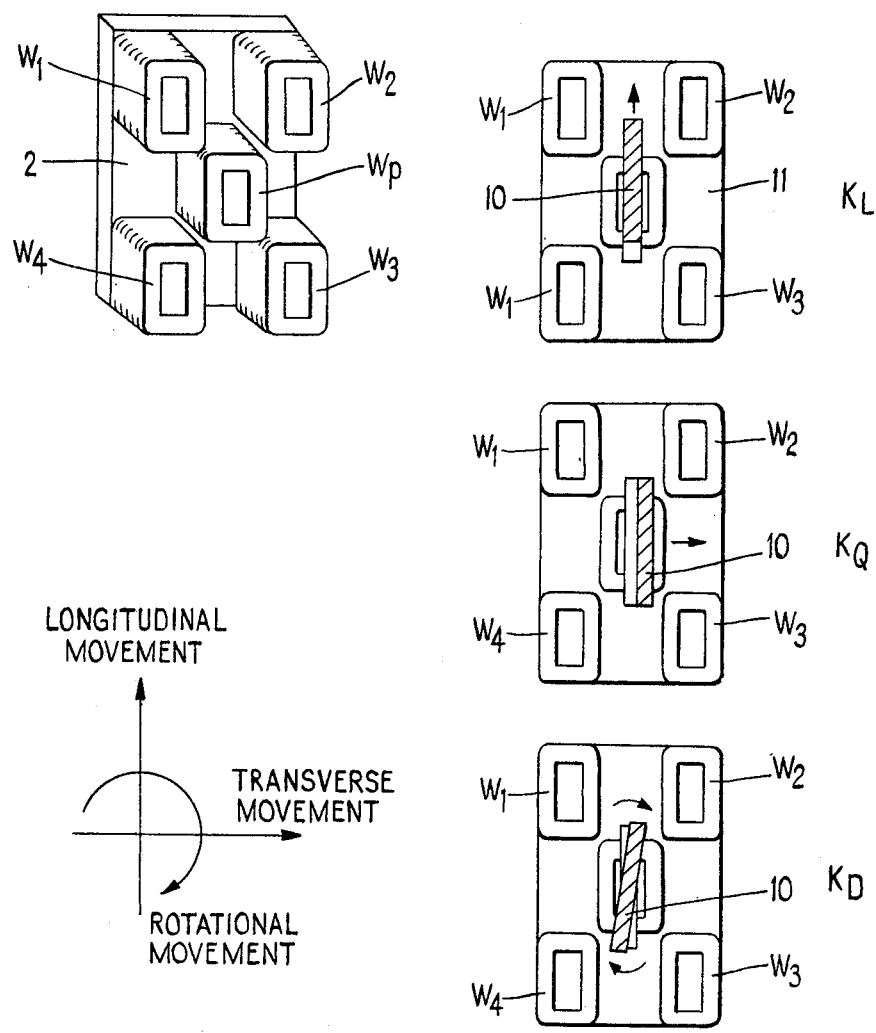
FIG. 1 is a three-component differential transformer in accordance with the invention having one primary and four secondary coils for determining the longitudinal, transverse and rotary components of the movement of a ferrite object in one plane.
Figure 2A:
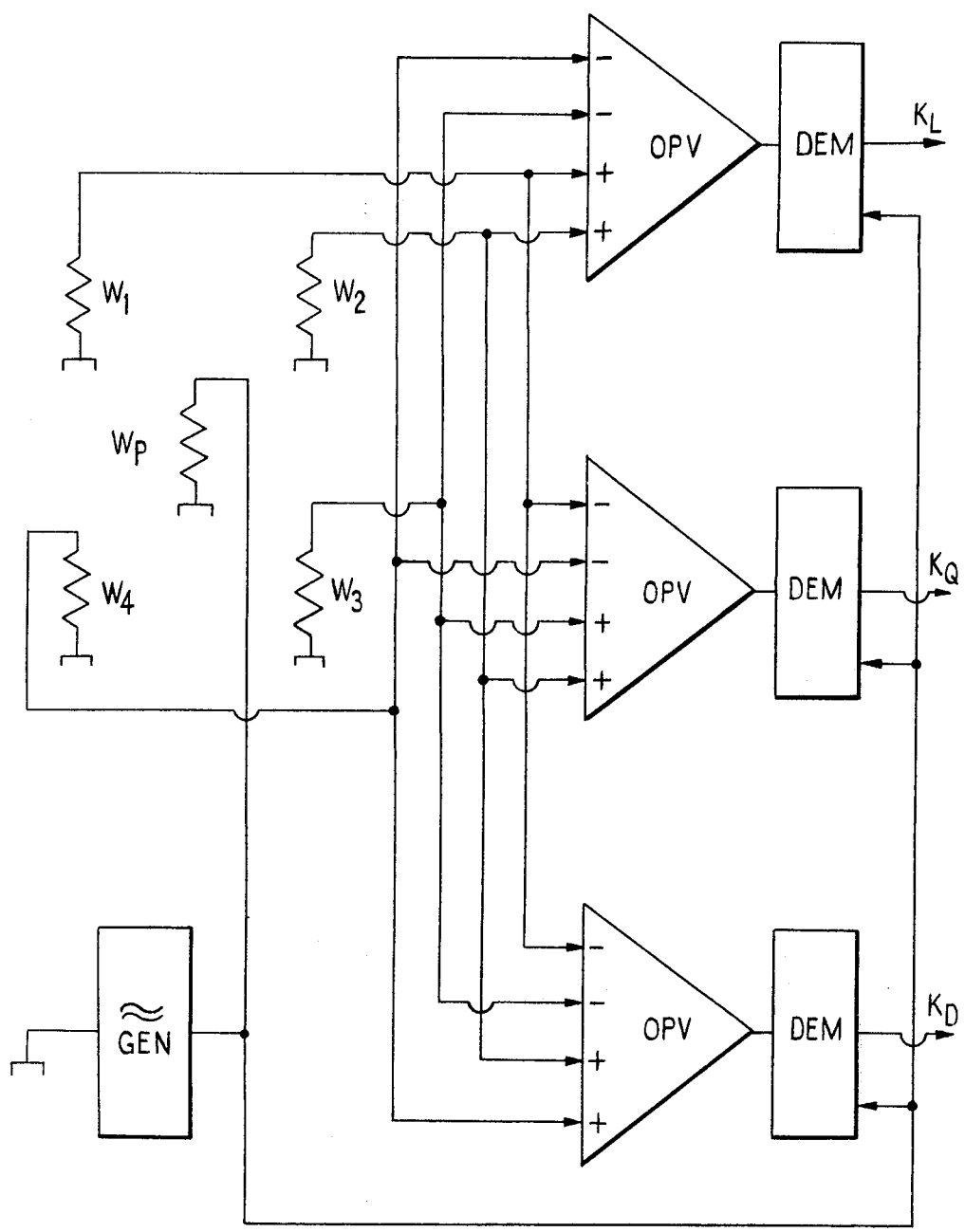
FIG. 2A is a practical example of the invention, employing a differential transformer, the necessary computing operations for determining the longitudinal, transverse and rotary components by an analog method are carried out by the aid of sum and difference amplifiers.
Figure 2B:
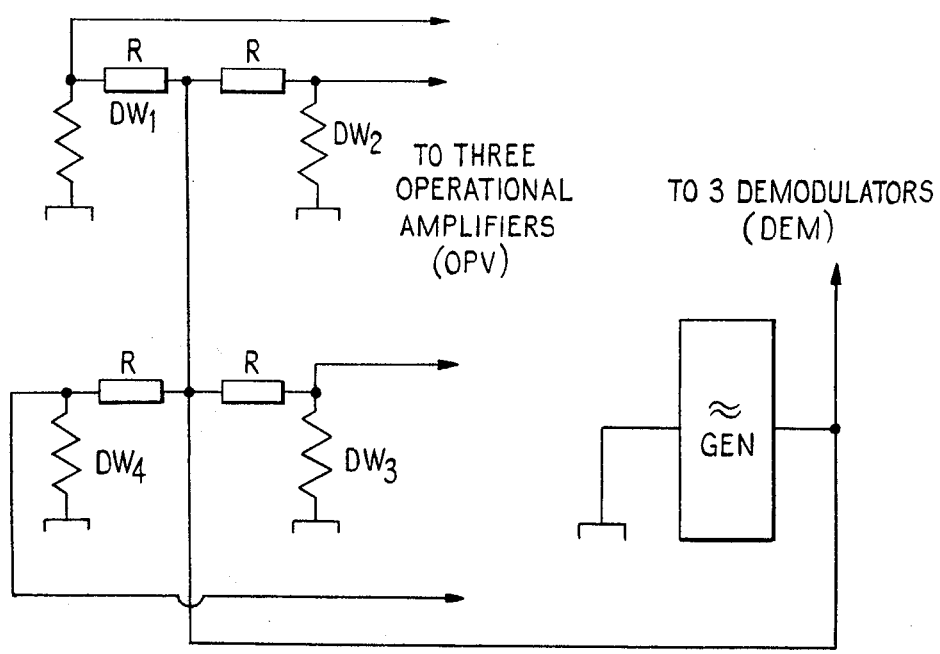
FIG. 2B shows a practical example corresponding to that of FIG. 2A, but employing a differential choke.

The three-component differential transformer represented schematically in FIG. 1 operates as a mechanical-electrical transducer for simultaneously detecting measuring the forward, sideways and rotary components of the movement of an oblong ferrite object 10 in one plane. The object 10 is shown in hatched lines. It consists, for example, of a thin strip of a material having high magnetic permeability. The differential transformer has a rectangular horizontal ferrite plate 11 supporting five polepieces, of which one is situated at the centre and the others are situated symmetrically at the four corners of the plate. Upon the central polepiece there is arranged a primary winding $W_p$, which is fed from a generator, for example, with a 50 kHz alternating voltage and generates a corresponding magnetic field. (In the case where a suitable three-component differential choke is used in place of the transformer, the winding and excitation of the central polepiece is omitted). Upon the magnetic poles situated at the corners of the plate 11 there are mounted respective secondary windings $W_1$, $W_2$, $W_3$ and $W_4$, which receive equal fractions of the magnetic flux from the primary winding $W_p$ so long as the magnetic field is not asymmetrically distorted by the ferrite object 10 situated in the vicinity of the polepieces. If the object 10 indicated by the cross-hatching is displaced or rotated in the manner represented out of its central position and direction of equilibrium, there will appear characteristic differences between the alternating voltages induced in the individual secondary windings (or between the impedances of the individual choke windings of a corresponding differential choke). On the assumption that the deviations of the object 10 out of the equilibrium position and direction are small in comparison to the pole spacing of the multiple component transducer, there will be obtained from the induced voltages (or impedances) $S_1$ to $S_4$ of the windings $W_1$ to $W_4$, simple relationships for the longitudinal, transverse and rotary components of these deflections by the following algebraic operations:

Longitudinal component $K_L \alpha\ (+S_1 + S_2 - S_3 - S_4)$
Transverse component $K_Q \alpha\ (-S_1 + S_2 + S_3 - S_4)$
Rotary component $K_D \alpha\ (-S_1 + S_2 - S_3 + S_4)$ FIGS. 2A and 2B illustrate an electrical analog method for performing the necessary computing operations. According to FIG. 2A there are used three suitable operational amplifiers OPV each having two inverting inputs (−) and two non-inverting inputs (+). The four secondary windings ($W_1$ to $W_4$ of the transducer shown in FIG. 1 are connected to the four inputs of each amplifier OPV in such a manner that in each case the output voltage corresponds to the desired algebraic sum of the input voltage signals $S_1$ to $S_4$. The frequency generator GEN delivers a constant alternating voltage, for example, of 50 kHz for exciting the differential transformer through the primary winding $W_P$, and at the same time controls the demodulators DEM, by which the output voltages of the input amplifiers OPV are phase-dependently demodulated.

If a differential choke is used in place of the differential transformer then the inductive excitation through the primary winding $W_P$ is omitted. In this case the corresponding input voltages $S_1$ to $S_4$ of the amplifiers OPV are obtained by passing the generator current in each case, through a constant resistance R, to the choke windings $DW_1$ to $DW_4$ (FIG. 2B).

The alternating voltages occurring in these windings correspond to the impedances of the coils and can be processed by the analog method illustrated on the right hand side of FIG. 2A. In both cases it is possible to read immediately from the sign and magnitude of the demodulated direct voltage signals, i.e. the components $K_L$, $K_Q$ and $K_D$, the direction and magnitude of any longitudinal, transverse and rotary movements corresponding to the deflection of the ferrite object in a given plane.

Figure 3:
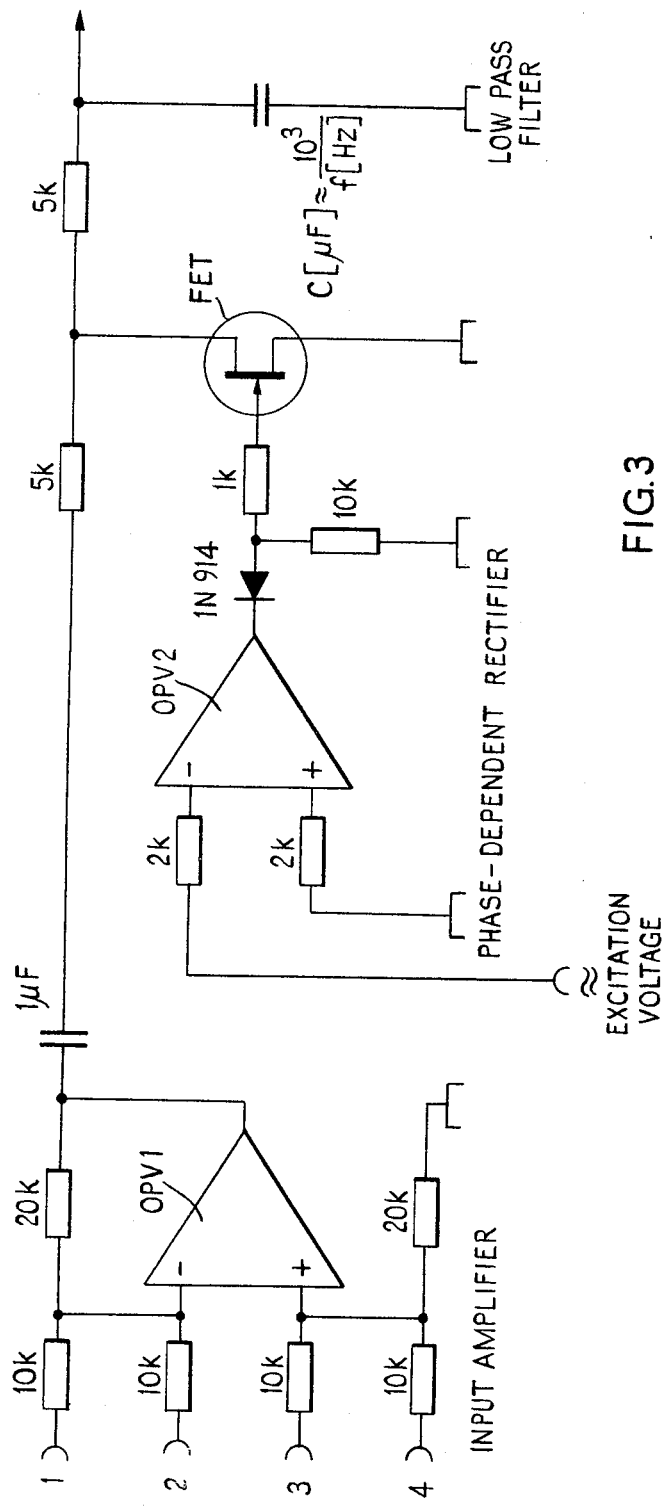
FIG. 3 is a preferred practical form of the special input amplifier with demodulator employed in FIG. 2A.

Analog circuits for addition and/or subtraction of a plurality of electrical signals, as well as circuits for the phase-dependent demodulation of alternating voltages are already known in numerous forms. A practical form preferred for its simplicity is indicated in FIG. 3. The processing of the input signals is effected with a difference amplifier OPV 1 in the form of an integrated circuit with two inverting inputs (−) and two non-inverting inputs (+) 1–4. The processing of more than four signals is possible in principle by corresponding extension of the number of inputs. The demodulation of the resulting alternating voltage is effected preferably by the aid of a semiconductor switch, such as a field effect transistor FET, which suppresses the output signal, for example, during the negative half wave of the excitation voltage, if the switch is driven via an open loop amplifier and a diode as in FIG. 3.

In this manner the output signal is rectified in a phase-dependent manner and, after subsequent smoothing by a suitable low pass filter, is available as a direct voltage signal with a phase-dependent sign for purposes of control, measurement and regulation.

The analog method represented in FIG. 2A and 2B for the appropriate evaluation of the signals $S_1$ to $S_4$ may be advantageously simplified under certain conditions, by series connecting the alternating current signals with regard to their phase in such a manner that the desired algebraic operation is directly effected. However, in this case, a separate group of secondary or choke windings on the outer polepieces of the transducer is required for each computing operation to be effected simultaneously.

Figure 4A:
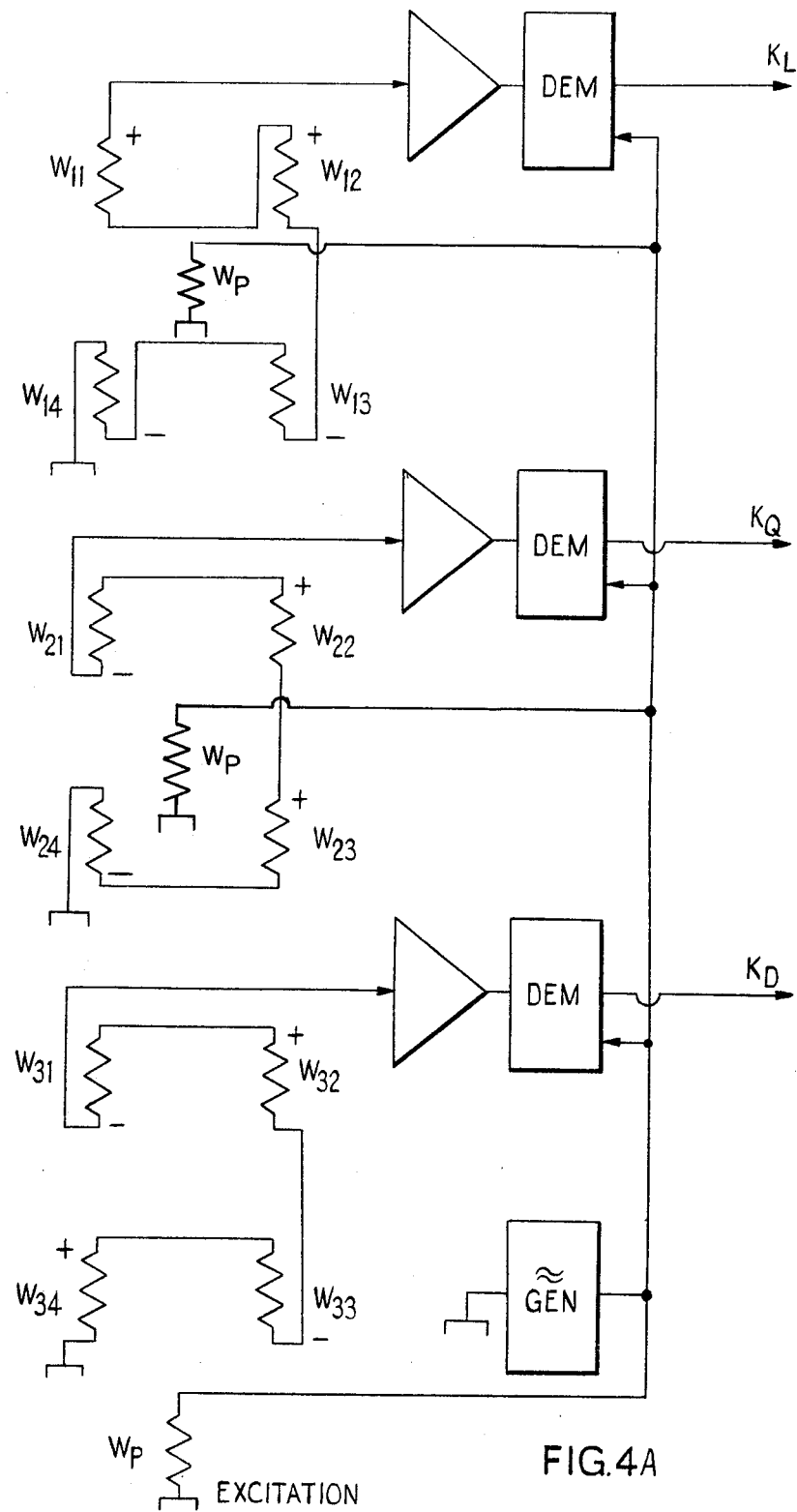
FIG. 4A is a further practical example of the invention wherein the computing operations for determining the longitudinal, transverse and rotary components of the movement are carried out by suitable interaction of the signals in separate groups of windings of the three-component transducer.

FIG. 4A illustrates the simultaneous determination of the components $K_L$, $K_Q$ and $K_D$ by suitable connection of the equivalent winding groups $W_{11}$ to $W_{14}$, and $W_{21}$ to $W_{24}$, and $W_{31}$ to $W_{34}$. In this case each of the outer polepieces of the device in FIG. 1 carries three similar secondary windings. The central polepiece for excitation via the primary winding Wp is missing in the equivalent differential choke with three groups of choke windings $DW_{11}$ to $DW_{14}$, $DW_{21}$ to $DW_{24}$ and $DW_{31}$ to $DW_{34}$.

Figure 4B:
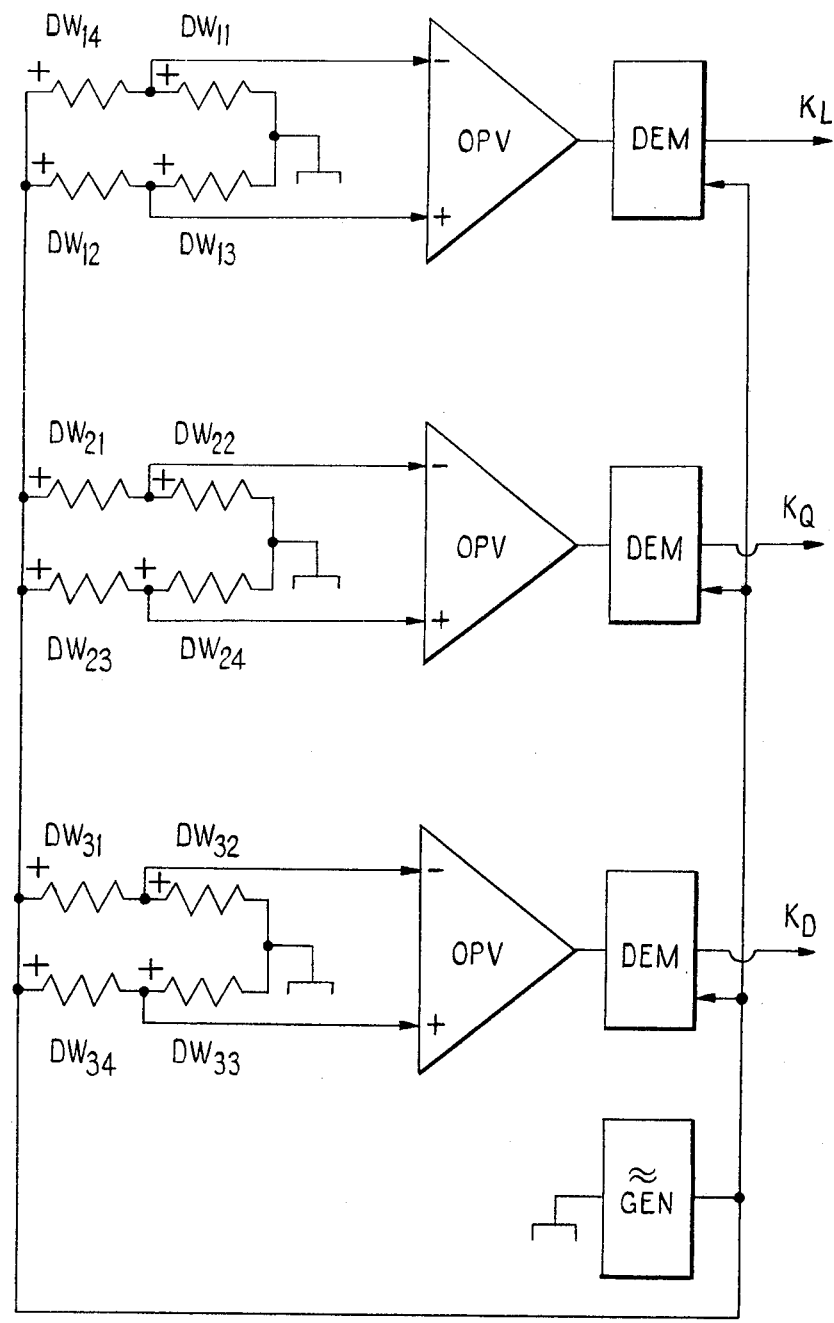
FIG. 4B is a modification of FIG. 4A for the case where a differential choke is used.

In the case of sufficiently small deviations of the ferrite object it is convenient to approximate the desired algebraic operation by incorporating the four windings of each group in the four branches of an alternating current resistance bridge as shown in FIG. 4B. The phase-dependently demodulated null voltages of the three bridges then represent by magnitude and sign the three independent components of translation and rotation.

Figure 5:
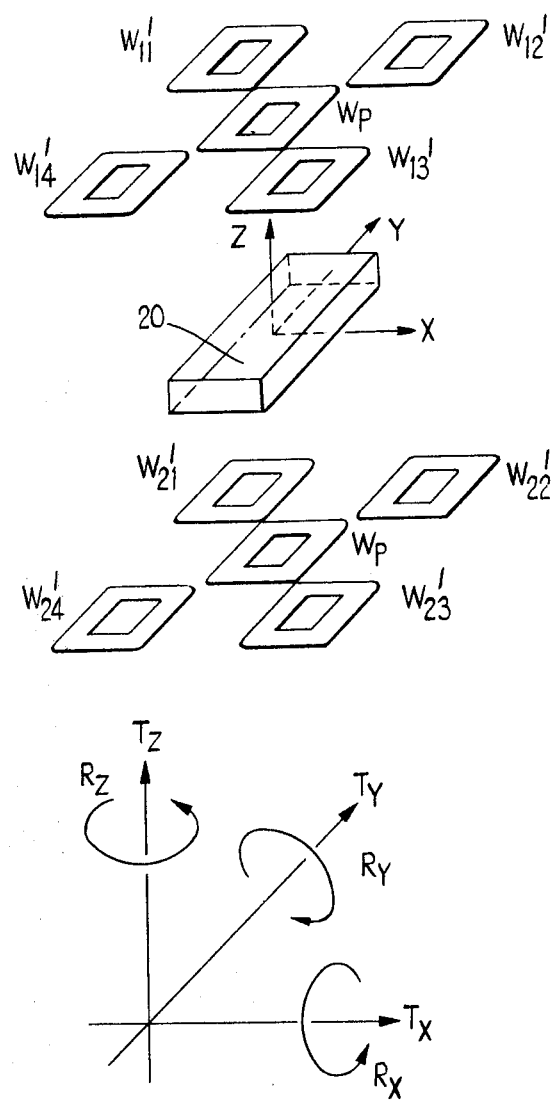
FIG. 5 is a further practical example for the complete determination of any sort of movements or positions of an object in space by simultaneous and measurement of the translatory and rotary components in three directions mutually at right angles in space.

The above described preferred devices for determining the three independent components of displacements occurring in a given plane, may be modified or extended without difficulty if other motion components or more motion components are to be measured simultaneously. FIG. 5 shows the essential features of a preferred device for the complete determination of displacements occurring in a given space, based upon the simultaneous determination of the independent components of translation and rotation in three mutually orthogonal directions X, Y and Z respectively. The device consists of two in-phase excited differential transformers, or alternatively two non-excited differential chokes both of the type shown in FIG. 1, these two transformers or chokes being located opposite to each other with the corresponding polepieces aligned as indicated in FIG. 5. A ferrite measuring object 20, situated in the free space between the two winding groups $W'_{11}$ to $W'_{14}$ and $W'_{21}$ to $W'_{24}$ is anisometric in respect of its length breadth and height. Under the condition that the deviations in any direction from the initial location and orientation of the object are small in comparison to the pole spacings of the six-component transducer, one obtains immediately with the notations given in FIG. 5 the following unequivocal relationships between, on the one hand, the translatory components $T_X$, $T_Y$, $T_Z$ and the rotary components $R_X$, $R_Y$, $R_Z$ of the deviations and, on the other hand, the induced voltages or impedances $S_{11}$ to $S_{14}$ and $S_{21}$ to $S_{24}$ of the two groups of windings:

$$T_X \alpha\ (-S_{11} + S_{12} + S_{13} - S_{14} - S_{21} + S_{22} + S_{23} - S_{24})$$

$$T_Y \alpha\ (+S_{11} + S_{12} - S_{13} - S_{14} + S_{21} + S_{22} - S_{23} - S_{24})$$

$$T_Z \alpha\ (+S_{11} + S_{12} + S_{13} + S_{14} - S_{21} - S_{22} - S_{23} - S_{24})$$

$$R_X \alpha\ (+S_{11} + S_{12} - S_{13} - S_{14} - S_{21} - S_{22} + S_{23} + S_{24})$$

$$R_Y \alpha\ (+S_{11} - S_{12} - S_{13} + S_{14} - S_{21} + S_{22} + S_{23} - S_{24})$$

$$R_Z \alpha\ (+S_{11} - S_{12} + S_{13} - S_{14} + S_{21} - S_{22} + S_{23} - S_{24})$$

The various methods for performing the appropriate algebraic operations on the electrical signals of three-component transducers can be easily adapted to the requirements of relationships. On account of the limitation to comparatively small deviations of the object from the initial position, three-component and six-component transducers are particularly suitable for controlling a motion-compensating servo system, which counteracts any deviation either by resetting the object into its initial location and orientation with respect to the transducer or by resetting the location and orientation of the transducer with respect to the position of of the moving object. The combination of the proposed transducers with the appropriate servo control system can be used in a variety of technical applications either for object positioning or for object tracking, guidance and accelerometry.

I claim:

1. A mechanical-electrical transducer for the simultaneous contactless and reaction-free determination of at least three mutually independent components of displacement of an object coupled to the transducer, including two translational and one rotational component, comprising an oblong ferrite body attached to the object, and at least three different signal sources inductively coupled to the ferrite body and spatially distributed with respect to the ferrite body, wherein said signal sources comprise at least three spatially separated polepieces each of which is equipped with at least one secondary winding of a differential transformer having a primary winding connected to an alternating current supply, and including an electrical analog circuit having at least three difference amplifier and demodulator means, said circuit effecting at least three mutually independent combinations of the outputs of the said at least three spatially separated polepieces to provide at least three mutually independent signals corresponding in sign and magnitude to the said components of displacement of an object from a determined initial position.

2. A mechanical-electrical transducer for the simultaneous contactless and reaction-free determination of at least three mutually independent components of displacement of an object coupled to the transducer, including two translational and one rotational component, comprising an oblong ferrite body attached to the object and at least three different signal sources inductively coupled to and spatially distributed with respect to the ferrite body, wherein said signal sources comprise at least three spatially separated polepieces each of which equipped with at least one choke winding of a differential choke and including an analog circuit which effects at least three mutually independent combinations of the impedances, or impedance-dependent alternating current signals, of the choke windings of the said at least three spatially separated polepieces to provide the desired mutually independent components of displacement directly, at least three alternating current resistance bridges, each of which comprises a choke winding from each of the said polepieces and demodulator means for the at least three outputs of the bridge circuit said outputs representing in sign and magnitude the desired components of displacement.

3. A mechanical-electrical transducer for the simultaneous contactless and reaction-free determination of at least three mutually independent components of displacement of an object coupled to the transducer, including two translational and one rotational component, comprising an oblong ferrite body attached to the object and at least three different signal sources inductively coupled to and spatially distributed with respect to the ferrite body, wherein said signal sources comprise at least three spatially separated polepieces each of which equipped with at least one choke winding of a differential choke and including an analog circuit which effects at least three mutually independent combinations of the impedances, or impedance-dependent alternating current signals, of the choke windings of the said at least three spatially separated polepieces to provide the desired mutually independent components of displacement directly, an electrical analog circuit having at least three difference amplifiers and demodulator means, said circuit effecting at least three mutually independent combinations of the outputs of said at least three spacially separated polepieces to provide at least three mutually independent signals corresponding in sign and magnitude to the said components of displacement of said object from a determined initial position.

4. A transducer for the determination of mutually independent components of object translation and rotation in a single two-dimensional plane as claimed in claim 1 wherein the differential transformer comprises a central polepiece which is equipped with the primary winding and symmetrically surrounded by four outer polepieces, each of which is equipped with either one or three of said secondary windings.

5. A transducer for the determination of three mutually independent components of object translation and rotation in a single two-dimensional plane as claimed in claim 2 wherein the differential chokes consist merely of four of said polepieces, each equipped with either one or three choke windings.

6. A transducer for six mutually independent components of object translation and rotation in a three-dimensional space as claimed in claim 1 in which said ferrite body is anisometric and comprising two in-phase excited differential transformers located on opposite sides of said ferrite body, the corresponding polepieces of said transformers being aligned opposite each other and equipped with either one or six signal windings.

7. A transducer for six mutually independent components of object translation and rotation in a three-dimensional space as claimed in claim 2 in which said ferrite body is anisometric and comprising two non-excited differential chokes located on opposite sides of the ferrite body, with the corresponding polepieces aligned opposite each other and equipped with one or six signal windings.

* * * * *